United States Patent
Leconte

(10) Patent No.: US 9,215,952 B2
(45) Date of Patent: Dec. 22, 2015

(54) MODULAR FOOD INGREDIENT ROLLER

(76) Inventor: Brice B. Leconte, Reston, VA (US)

( * ) Notice: Subject to any disclaimer, the term of this patent is extended or adjusted under 35 U.S.C. 154(b) by 499 days.

(21) Appl. No.: 13/591,410

(22) Filed: Aug. 22, 2012

(65) Prior Publication Data

US 2013/0059024 A1    Mar. 7, 2013

Related U.S. Application Data

(60) Provisional application No. 61/531,308, filed on Sep. 6, 2011.

(51) Int. Cl.
| A47J 43/00 | (2006.01) |
| A47J 43/20 | (2006.01) |
| A21C 11/22 | (2006.01) |
| A21C 3/06 | (2006.01) |
| A21C 11/00 | (2006.01) |
| A21C 11/24 | (2006.01) |

(52) U.S. Cl.
CPC .............. *A47J 43/20* (2013.01); *A21C 11/22* (2013.01); *A21C 3/065* (2013.01); *A21C 11/008* (2013.01); *A21C 11/24* (2013.01)

(58) Field of Classification Search
CPC ...... A21C 3/021; A21C 3/065; A21C 11/008; A21C 11/22; A21C 11/24; A47J 43/20
USPC ......... 425/193, 194, 237, 294, 301, 318, 328, 425/362, 368, 184
See application file for complete search history.

(56) References Cited

U.S. PATENT DOCUMENTS

| 2,070,199 | A | * | 2/1937 | Dixon | 492/48 |
| 2,259,854 | A | * | 10/1941 | Langel | 249/163 |
| 2,699,738 | A | * | 1/1955 | Brittain | 426/556 |
| 3,861,291 | A | * | 1/1975 | Guzaski | 99/450.2 |
| 3,869,238 | A | * | 3/1975 | Racca | 425/294 |
| 4,718,769 | A | * | 1/1988 | Conkey | 366/69 |
| 4,958,577 | A | * | 9/1990 | Demaio et al. | 108/43 |
| 5,042,647 | A | * | 8/1991 | Tyler et al. | 198/822 |
| 6,263,788 | B1 | * | 7/2001 | Chiang | 99/450.2 |
| 7,686,752 | B2 | * | 3/2010 | Dua et al. | 492/14 |
| 2006/0225579 | A1 | * | 10/2006 | Errera | 99/388 |
| 2007/0207907 | A1 | * | 9/2007 | Price | 492/57 |
| 2008/0087385 | A1 | * | 4/2008 | Clauss | 160/133 |

* cited by examiner

*Primary Examiner* — Seyed Masoud Malekzadeh
(74) *Attorney, Agent, or Firm* — Benesch Friedlander Coplan & Aronoff LLP; Thomas Y. Kendrick

(57) ABSTRACT

Methods, systems, and apparatuses are disclosed for a modular food ingredient roller.

18 Claims, 7 Drawing Sheets

MODULAR FOOD INGREDIENT ROLLER

CROSS-REFERENCE TO RELATED APPLICATIONS

This application claims priority from U.S. Provisional Patent Application No. 61/531,308, filed on Sep. 6, 2011, which is incorporated by reference herein in its entirety.

BACKGROUND

Various food items are served in roll form. For example, sushi rolls, burritos, chimichangas, egg rolls, enchiladas, and spring rolls, just to name a few. However, forming these food items into rolls can be difficult, especially when the roll material is delicate or various ingredients are utilized. While some food roller devices have been available over the years, they are typically specific to a certain food and limited in that they allow only the forming of rolls of a specific size or shape.

What is needed is a food ingredient roller capable of forming various food rolls of various shapes and sizes as selected by a user of the roller.

SUMMARY

In one embodiment, a modular food ingredient roller apparatus is provided, the apparatus comprising: a plurality of central slats each comprising at least one connection mechanism on a first side and at least one connection mechanism on a second side, wherein the at least one connection mechanism of a first central slat is configured to selectively pivotally connect to the at least one connection mechanism of a second central slat; a first end slat comprising at least one connection mechanism, wherein the at least one connection mechanism is configured to selectively pivotally connect to the at least one connection mechanism of a central slat; and a second end slat comprising at least one connection mechanism, wherein the at least one connection mechanism is configured to selectively pivotally connect to the at least one connection mechanism of a central slat.

In another embodiment, a modular food ingredient roller system is provided, the system comprising: a roller apparatus comprising: a plurality of central slats selectively pivotally connectable to one another, a first end slat and a second end slat each selectively pivotally connectable to at least one of the plurality of central slats; and a frame apparatus comprising an inner wall and an outer wall, wherein the inner wall comprises a height, and wherein the outer wall comprises a plurality of tab portions extending from the frame apparatus and configured to engage at least two edges of the roller apparatus.

In another embodiment, a modular food ingredient roller system is provided, the system comprising: a roller apparatus comprising: a plurality of central slats selectively pivotally connectable to one another, a first end slat and a second end slat each selectively pivotally connectable to at least one of the plurality of central slats; and a roll cutting guide apparatus comprising a plurality of slits substantially evenly spaced and configured to accept a knife for slicing of a roll.

BRIEF DESCRIPTION OF THE DRAWINGS

The accompanying figures, which are incorporated in and constitute a part of the specification, illustrate various example apparatuses, systems, and methods, and are used merely to illustrate various example embodiments.

DETAILED DESCRIPTION

Figure 1:
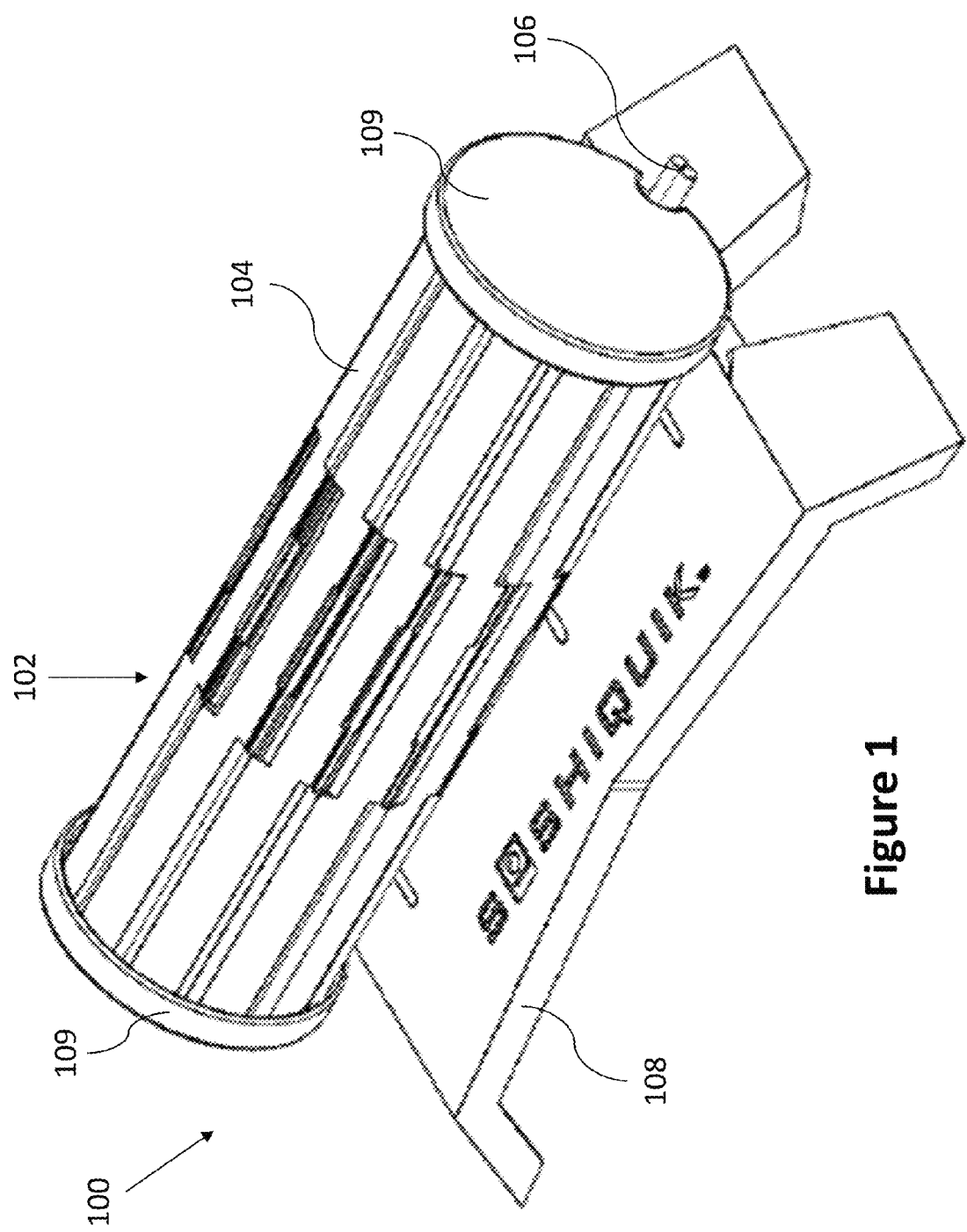
FIG. 1 illustrates an example arrangement of a modular food ingredient roller system.

FIG. 1 illustrates a food ingredient roller system 100. Roller system 100 may include a modular food ingredient roller apparatus 102 comprising a plurality of central slats 104. Roller apparatus 102 may additionally comprise one or more grasping portions 106 extending from one or more ends of roller apparatus 102. Roller system 100 may additionally comprise a base apparatus 108 and one or more end caps 109.

End caps 109 may be configured to maintain roller apparatus 102 in a substantially cylindrical shape. In one embodiment, end caps 109 are configured to maintain roller apparatus 102 in a substantially cylindrical shape for presentation and/or storage of roller apparatus 102. In another embodiment, roller apparatus 102 defines a central interior cavity when formed into a substantially cylindrical shape, and end caps 109 are configured to close off the central interior cavity so as to allow any of various small items or tools to be stored within the central interior cavity. End caps 109 may include notches, and grasping portions 106 may extend through the notches to assist in keeping roller apparatus 102 in a substantially cylindrical shape. End caps 109 may include an interior groove to accept the edge of roller apparatus 102 to assist in keeping roller apparatus 102 in a substantially cylindrical shape.

In one embodiment, end caps 109 comprise a substantially cylindrical wall (not illustrated) and a flat bottom portion, such that end caps 109 may be removed from roller apparatus 102 and used as a vessel to contain any of food ingredients, sauces, tools, etc. End caps 109 may be formed of any of a number of materials, including an organic material (e.g., wood), a polymer, a metal, and a composite.

Figure 2:
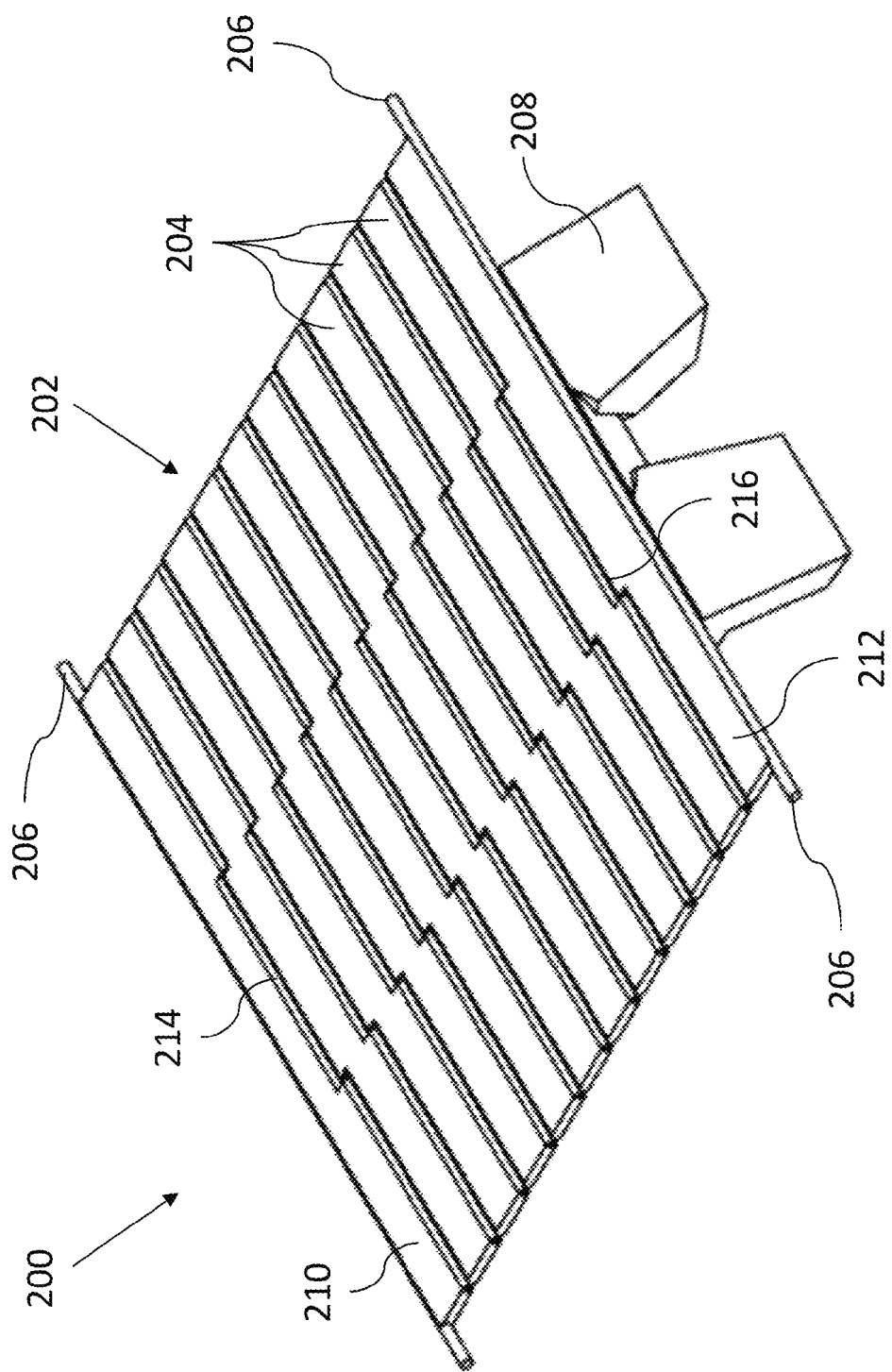
FIG. 2 illustrates an example arrangement of a modular food ingredient roller system.

FIG. 2 illustrates a food ingredient roller system 200. Roller system 200 may include a modular food ingredient roller apparatus 202 comprising a plurality of central slats 204. Roller apparatus 202 may additionally comprise one or more grasping portions 206 extending from one or more ends of roller apparatus 202. Roller system 200 may additionally comprise a base apparatus 208. Roller apparatus 202 may comprise a first end slat 210 and a second end slat 212, which in one embodiment include grasping portions 206. First end slat 210 may comprise at least one connection mechanism 214. Second end slat 212 may comprise at least one connection mechanism 216.

In one embodiment, roller apparatus 202 comprises a plurality of central slats 204 each comprising at least one connection mechanism on a first side and at least one connection mechanism on a second side. In another embodiment, the at least one connection mechanism of a first central slat 204 is configured to selectively pivotally connect to the at least one connection mechanism of a second central slat 204.

Central slats 204 may comprise substantially flat bodies having a width that makes up the entire width of roller apparatus 202. In one embodiment, central slats 204 comprise a width of less than about 12 in. In another embodiment, central slats 204 comprise a width between about 4 in. and about 10 in. In another embodiment, central slats 204 comprise a width between about 6 in. and about 9 in. In another embodiment, central slats 204 comprise a width between about 8 in. and 9 in. Central slats 204 may comprise a length that makes up a portion of the entire length of roller apparatus 202. In one embodiment, central slats 204 comprise a length of less than about 2 in. In another embodiment, central slats 204 comprise a length between about 0.25 in. and about 1.5 in. In another embodiment, central slats 204 comprise a length between about 0.375 in. and about 1.0 in. In another embodiment, central slats 204 comprise a length between about 0.5 in. and about 0.75 in. Central slats 204 may comprise a thickness that makes up the enter thickness of roller apparatus 202. In one embodiment, central slats 204 comprise a thickness of less than about 0.5 in. In another embodiment, central slats 204 comprise a thickness between about 0.0625 in. and about 0.375 in. In another embodiment, central slats 204 comprise a thickness between about 0.1 in. and about 0.2 in.

In one embodiment, a plurality of central slats 204 may be linked together to form a chain of central slats 204, which may make up a portion of the entire length of roller apparatus 202. The plurality of central slats 204 may be pivotally connected with one another such that one central slat 204 may pivot relative to an adjacent central slat 204 about an axis that is axially aligned with the at least one connection mechanism of each central slat 204 that selectively connect the adjacent central slats 204. In one embodiment, a plurality of central slats 204 may be pivotally connected to form a chain of central slats 204 such that the chain of central slats 204 may be formed into a variety of shapes including a substantially cylindrical shape (illustrated as 102 in FIG. 1). In another embodiment, a plurality of central slats 204 may be pivotally connected to form a chain of central slats 204 such that the chain of central slats 204 may be formed into a variety of shapes having any of a variety of cross sections, including a substantially circular cross section, a substantially elliptical cross section, a substantially oval cross section, a substantially semi-circular cross section, a substantially pentagonal cross section, a substantially hexagonal cross section, a substantially heptagonal cross section, a substantially octagonal cross section, a substantially nonagonal cross section, and a substantially decagonal cross section. In one embodiment, greater or fewer central slats 204 may be linked to one another so as to create a roller apparatus cross section having a larger or smaller diameter, respectively.

In another embodiment, greater or fewer central slats 204 may be linked to one another so as to increase or decrease the entire length of roller apparatus 202, respectively. In one embodiment, roller apparatus 202 comprises at least four central slats 204.

In one embodiment, central slats 204 are removably connected to one another. In another embodiment, central slats 204 may be separated from one another to facilitate easier cleaning and washing. In another embodiment, central slats 204 may be separated from one another for placement into a silverware tray in a dishwasher for convenient cleaning.

First end slat 210 may have substantially similar qualities and dimensions as described above with respect to central slats 204. In one embodiment, first end slat 210 comprises at least one connection mechanism 214 extending from only one side. The at least one connection mechanism 214 is configured to selectively connect to at least one connection mechanism of a central slat 204. In another embodiment, the at least one connection mechanism 214 is configured to pivotally connect to at least one connection mechanism of a central slat 204. In another embodiment, first end slat 210 may pivot relative to an adjacent central slat 204 about an axis that is axially aligned with the at least one connection mechanism 214 and the at least one connection mechanism of the adjacent central slat 204.

First end slat 210 may comprise may comprise at least one grasping portion 206. In one embodiment, first end slat 210 comprises two grasping portions 206, wherein the first grasping portion 206 extends from a first end of the first end slat 210 and the second grasping portion 206 extends from a second end of the first end slat 210.

Second end slat 212 may have substantially similar qualities and dimensions as described above with respect to central slats 204. In one embodiment, second end slat 212 comprises at least one connection mechanism 216 extending from only one side. The at least one connection mechanism 216 is configured to selectively connect to at least one connection mechanism of a central slat 204. In another embodiment, the at least one connection mechanism 216 is configured to pivotally connect to at least one connection mechanism of a central slat 204. In another embodiment, second end slat 212 may pivot relative to an adjacent central slat 204 about an axis that is axially aligned with the at least one connection mechanism 216 and the at least one connection mechanism of the adjacent central slat 204.

Second end slat 212 may comprise may comprise at least one grasping portion 206. In one embodiment, second end slat 212 comprises two grasping portions 206, wherein the first grasping portion 206 extends from a first end of the second end slat 212 and the second grasping portion 206 extends from a second end of the second end slat 212.

Each of central slats 204, first end slat 210 and second end slat 212 may be formed of a variety of materials, including an organic material (e.g., wood), a polymer, a metal, and a composite.

In one embodiment, roller apparatus 202 a plurality of central slats 204, a first end slat 210, and a second end slat 212 that can be formed into a substantially cylindrical orientation. In one embodiment, roller apparatus 202 in a substantially cylindrical orientation may comprise a cylindrical diameter between about 0.5 in. and about 5.0 in. In another embodiment, roller apparatus 202 in a substantially cylindrical orientation may comprise a cylindrical diameter between about 0.75 in. and about 4.0 in. In another embodiment, roller apparatus 202 in a substantially cylindrical orientation may comprise a cylindrical diameter between about 1.0 in. and about 3.0 in.

In one embodiment, a user may select the number of central slats 204 used in roller apparatus 202 for the specific size of roll to be made. Alternatively, the full roller apparatus 202 can be utilized and overlapped upon itself. It is not required that first end slat 210 and second end slat 212 end adjacent to one another during rolling of a food article. That is, if a smaller roll is desired, then first end slat 210 and second end slat 212 can extend past one another as roller apparatus 202 is overlapped upon itself.

Figure 3:
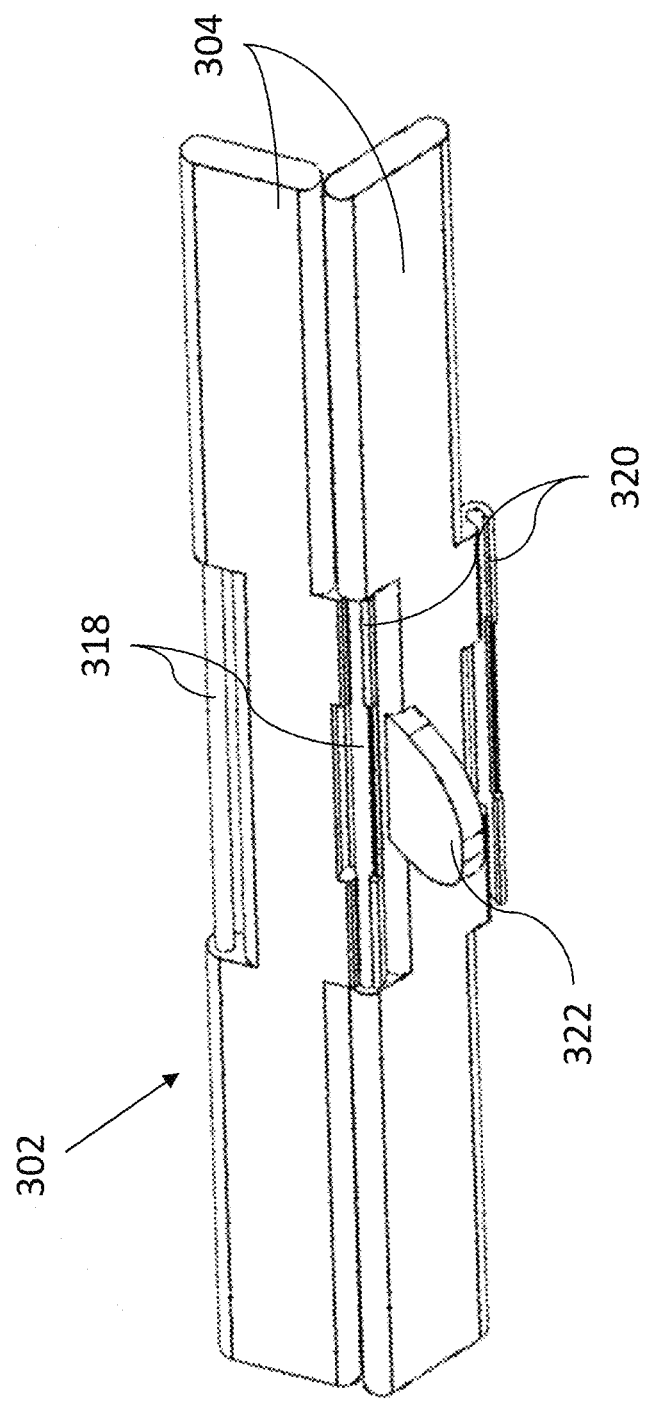
FIG. 3 illustrates an example arrangement of a modular food ingredient roller apparatus.

FIG. 3 illustrates a portion of a roller apparatus 302. Roller apparatus 302 comprises a plurality of central slats 304. Each of central slats 304 comprises at least one connection mechanism 318 on a first side, and at least one connection mechanism 320 on a second side. At least one of central slats 304 may comprise an anchor portion 322 extending substantially normally from a surface of central slat 304.

In one embodiment, connection mechanism 318 comprises an elongated shaft extending substantially parallel to an edge of central slat 304. Connection mechanism 318 may extend along the entire width of central slat 304 or along only a segment of the width of central slat 304. The elongated shaft may be formed of a variety of materials, including an organic material (e.g., wood), a polymer, a metal, and a composite.

In one embodiment, connection mechanism 320 comprises a hooked member configured to clip over the elongated shaft of connection mechanism 318. Connection mechanism 320 may extend along the entire width of central slat 304 or along only a segment of the width of central slat 304. The hooked member may be formed of a variety of materials, including an organic material (e.g., wood), a polymer, a metal, and a composite. In another embodiment, the hooked member is an integral part of central slat 304 and is formed of the same material as central slat 304.

In one embodiment, each of central slats 304 comprise connection mechanism 318 oriented on a first side and connection mechanism 320 oriented on a second side. In one embodiment, first end slat and second end slat each comprise one of connection mechanism 318 or connection mechanism 320. In another embodiment, first end slat comprises connection mechanism 318 and second end slat comprises connection mechanism 320.

Connection mechanism 318 and connection mechanism 320 may comprise any of a variety of connection mechanisms configured to allow pivotal connection of elements, including a hinge pin and socket, screws, a resilient connector, string, cable, chain, and hook.

Anchor portion 322 may be configured to selectively engage at least one of a rolling anchor slot and a storage anchor slot of a base apparatus. Anchor portion 322 may be formed of a variety of materials, including an organic material (e.g., wood), a polymer, a metal, and a composite. In one embodiment, anchor portion 322 is an integral part of central slat 304 and is formed of the same material as central slat 304. In one embodiment, anchor portion 322 may extend from any of central slats 304. In another embodiment, anchor portion 322 extends from central slat 304 directly adjacent to one of the first end slat and the second end slat. In another embodiment, anchor portion 322 extends from central slat 304 that is substantially centrally located in the plurality of central slats 304.

Figure 4:
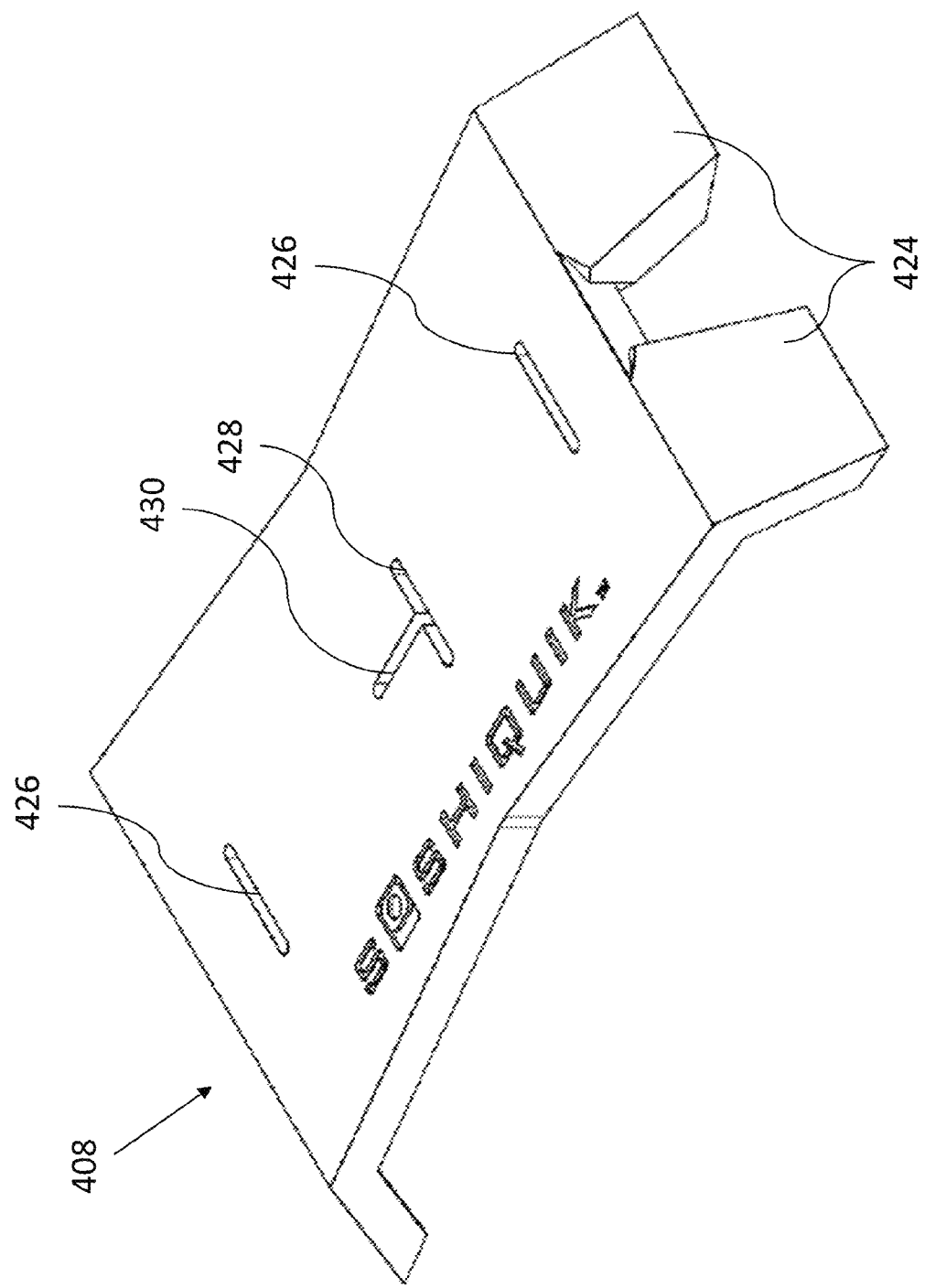
FIG. 4 illustrates an example arrangement of a base apparatus for a modular food ingredient roller system.

FIG. 4 illustrates a base apparatus 408. Base apparatus 408 comprises a plurality of legs 424. Base apparatus 408 may include end rolling anchor slots 426, a center rolling anchor slot 428, and a storage anchor slot 430.

Base apparatus 408 may comprise a plurality of legs 424. In one embodiment, base apparatus 408 is substantially rectangular and comprises a leg 424 at each corner of base apparatus 408. In another embodiment, base apparatus 408 comprises a leg 424 substantially centrally oriented extending from the underside of base apparatus 408. Legs 424 may be configured to raise base apparatus 408 and the roller apparatus off the surface upon which base apparatus 408 rests so as to facilitate the ability to grasp the roller apparatus from below the roller apparatus.

In one embodiment, during operation, the roller apparatus is laid upon the upper surface of base apparatus 408. The anchor portion of one of the plurality of central slats is inserted into one of end rolling anchor slots 426 and center rolling anchor slot 428. In one embodiment, engaging the anchor portion to one of end rolling anchor slots 426 and center rolling anchor slot 428 temporarily selectively connects the roller apparatus to base apparatus 408 so as to assist in preventing unwanted shifting or movement of the roller apparatus during its use.

In one embodiment, during presentation or storage, the roller apparatus is oriented into a substantially cylindrical shape upon the upper surface of base apparatus 408. The anchor portion of one of the plurality of central slats is inserted into the storage anchor slot 430. Inserting the anchor portion of one of the plurality of central slats into the storage anchor slot 430 temporarily selectively connects the roller apparatus to base portion 408 so as to prevent the roller apparatus from rolling or sliding off of base portion 408 during presentation or storage.

Base apparatus 408 may be formed of a variety of materials, including an organic material (e.g., wood), a polymer, a metal, and a composite.

Figure 5:
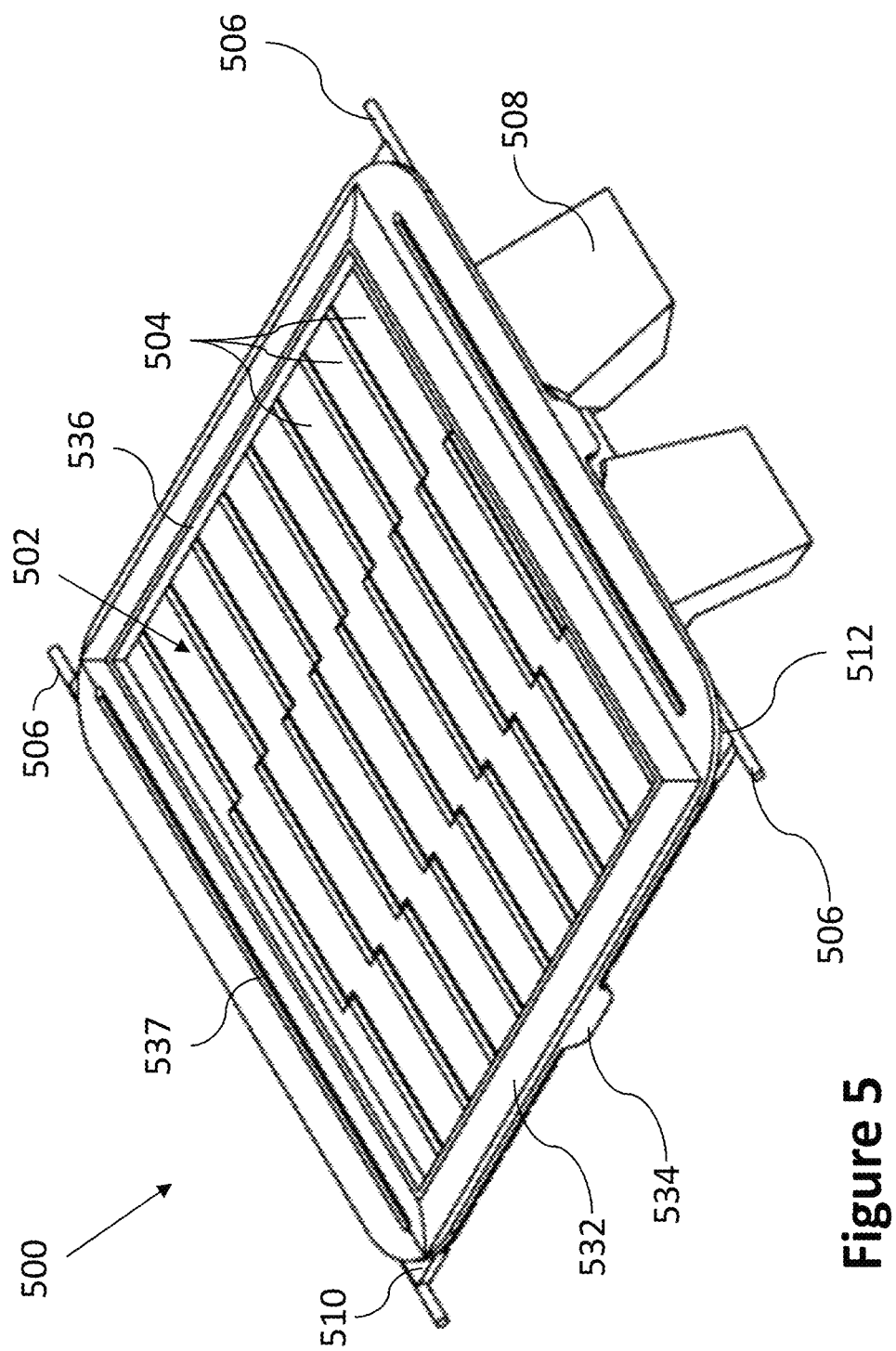
FIG. 5 illustrates an example arrangement of a modular food ingredient roller system.

FIG. 5 illustrates a food ingredient roller system 500. Roller system 500 may include a modular food ingredient roller apparatus 502 comprising a plurality of central slats 504. Roller apparatus 502 may additionally comprise one or more grasping portions 506 extending from one or more ends of roller apparatus 502. Roller system 500 may additionally comprise a base apparatus 508. Roller apparatus 502 may comprise a first end slat 510 and a second end slat 512, which in one embodiment include grasping portions 506. Roller system 500 may include a frame apparatus 532, comprising an outer wall comprising a plurality of tab portions 534, an inner wall 536 and a window 537.

In one embodiment frame apparatus 532 is configured to be placed over roller apparatus 502. In one embodiment, tab portions 534 extend from frame apparatus 532 and are configured to engage at least two edges of roller apparatus 502. Tab portions 534 may be configured to assist in keeping frame apparatus 532 from shifting or sliding relative to roller apparatus 502.

In one embodiment, inner wall 536 comprises a height. The height of inner wall 536 may act as a guide to indicate the appropriate thickness of a food article spread upon roller apparatus 502. In another embodiment, inner wall 536 acts as a guide to indicate the appropriate coverage area of a food article spread upon roller apparatus 502. For example, the food article may comprise rice, wherein a user of roller apparatus 502 may apply rice within frame apparatus 532 until the rice is substantially level with the height of inner wall 536, thus indicating the appropriate thickness for the rice. In another example, the food article may comprise rice being applied to a sushi nuri sheet. The nuri sheet may be laid upon roller apparatus 502 substantially even with the edges of roller apparatus 502. Frame apparatus 532 may be placed over the nuri sheet, after which rice is applied within the bounds of inner wall 536 of frame apparatus 532 to provide appropriate coverage area of the rice upon the nuri sheet while leaving the nuri sheet devoid of rice in the necessary portions.

In one embodiment, frame apparatus 532 comprises a window 537 extending substantially along one edge. Window 537 may comprise a narrow channel in frame apparatus 532 to allow a user to visually inspect the area beneath frame apparatus 532 at that point. In one embodiment, window 537 is accompanied by the term "TOP" to indicate to a user that that edge of frame apparatus 532 should be oriented at the "top" edge of roller apparatus 502 when a user is looking down on roller apparatus 502 and frame apparatus 532 from above. Window 537 may comprise a narrow channel in frame apparatus 532 to allow a user to visually verify that a rolling wrapper is properly positioned relative to frame apparatus 532. For example, the food article may comprise rice being applied to a sushi nuri sheet. The nuri sheet may be laid upon roller apparatus 502 substantially even with the edges of roller apparatus 502. Frame apparatus 532 may be placed over the nuri sheet. A user may visually verify that the nuri sheet is lined up relative to frame apparatus 532 such that the nuri sheet is not visible through window 537. Use of window 537 in such a manner may ensure that after rice is placed upon the nuri sheet, the nuri sheet is devoid of rice in the necessary portions.

Frame apparatus 532 may be formed of a variety of materials, including an organic material (e.g., wood), a polymer, a metal, and a composite.

Figure 6:
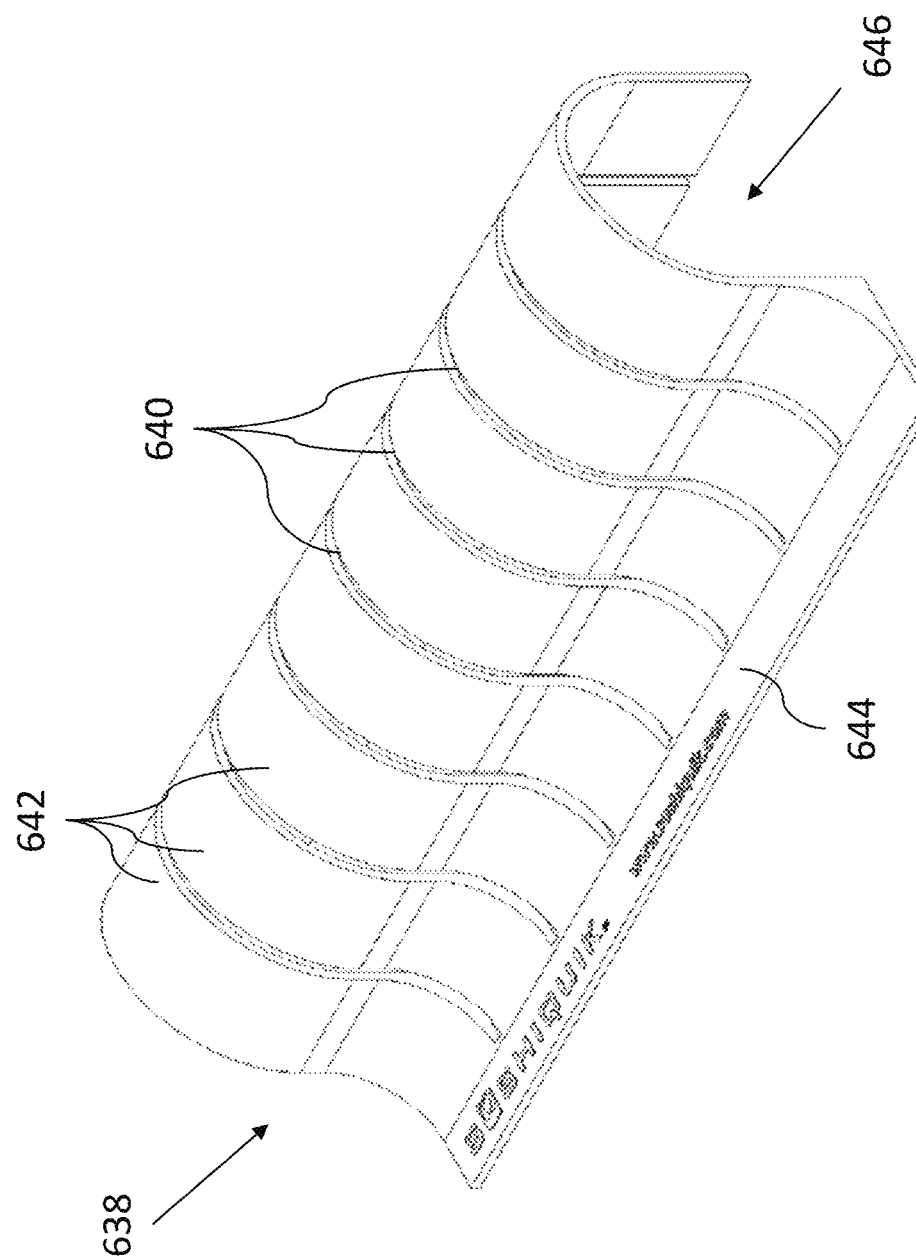
FIG. 6 illustrates an example arrangement of a roll cutting guide apparatus.

FIG. 6 illustrates a roll cutting guide apparatus 638. Roll cutting guide apparatus 638 comprises a plurality of slits 640 segmenting hooked portions 642 of roll cutting guide apparatus 638. Roll cutting guide apparatus 638 also includes a foundation portion 644 that ties each of hooked portions 642 together in a single unit. Roll cutting guide apparatus 638 may additionally comprise a substantially hollow cavity 646 within which a rolled food article may be placed.

Roll cutting guide apparatus 638 may comprise a plurality of slits 640. Plurality of slits 640 may be substantially evenly spaced and configured to accept a knife for slicing a roll placed within hollow cavity 646. In one embodiment, substantially hollow cavity 646 is oriented longitudinally along the length of roll cutting guide apparatus 638, while slits 640 are oriented substantially transversely to the roll cutting guide apparatus 638 and any roll placed within hollow cavity 646. In this manner, roll cutting guide apparatus 638 may be used to cut a rolled food article into any number of possible pieces as dictated by the number of slits 640. In one embodiment, roll cutting guide apparatus 638 comprises seven slits to cut a rolled food article into eight segments.

Hooked portions 642 may be comprised of a resilient material, such that hooked portions 642 may be depressed by a user to contact the rolled food article in hollow cavity 646 to assist in keeping a rolled food article in place relative to roll cutting guide apparatus 638. In one embodiment, hooked portions 642 may be resilient so as to flex out of the way during placement of a knife within slit 640 for cutting a rolled food article.

Roll cutting guide apparatus 638 may be formed of any of a number of materials, including an organic material (e.g., wood), a polymer, a metal, and a composite.

Figure 7:
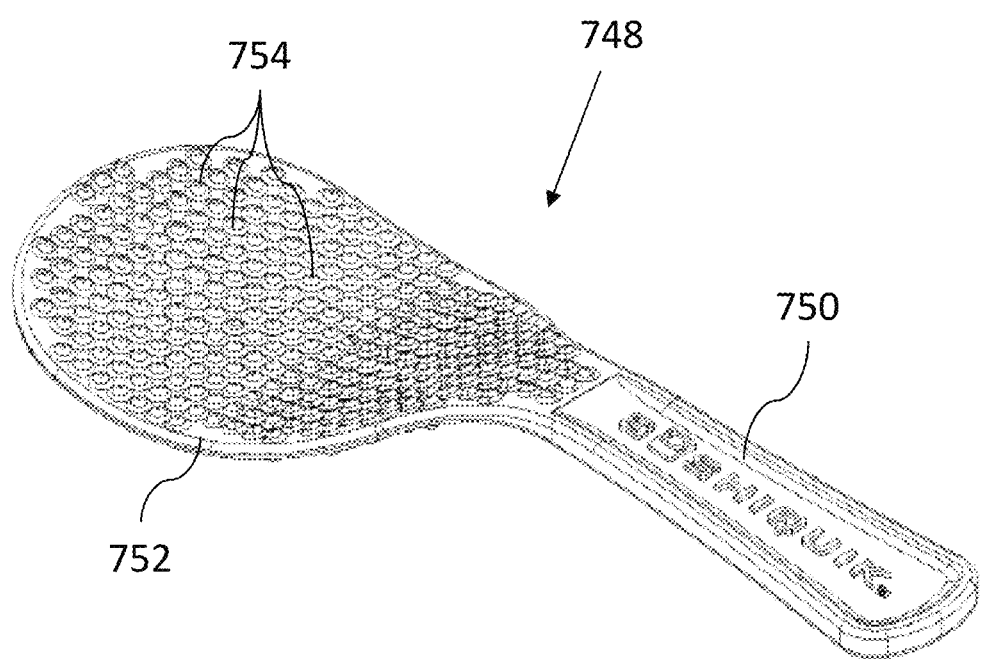
FIG. 7 illustrates an example arrangement of a rice paddle.

FIG. 7 illustrates a rice paddle 748 comprising a handle portion 750 and a scoop portion 752. Scoop portion may be covered with a plurality of prominent bumps 754 to more effectively spread adhesive food articles, such as sticky sushi rice. Bumps 754 assist in grabbing and spreading the adhesive ingredients while assisting in preventing adhesive food articles from adhering to scoop portion 752, and while assisting in disconnecting adhesive food articles (e.g., rice) from one another so as to avoid clumps of the food article.

Rice paddle 748 may be formed of any of a number of materials, including an organic material (e.g., wood), a polymer, a metal, and a composite.

EXAMPLE 1

In one embodiment, as illustrated in FIGS. 1-7, food ingredient roller system 100 is used for making sushi rolls by the following steps:

1) Remove end caps 109 from roller apparatus 102 and roll open roller apparatus 102;

2) Turn roller apparatus 102 90 degrees relative to base apparatus 108. Select the number of central slats 204 preferred for the size of roll to be made. Alternatively, the full roller apparatus 202 can be utilized and overlapped upon itself. It is not required that first end slat 210 and second end slat 212 end adjacent to one another during rolling of a food article. That is, if a smaller roll is desired, then first end slat 210 and second end slat 212 can extend past one another as roller apparatus 202 is overlapped upon itself.

3) Insert anchor portion 322 into one of end rolling anchor slots 426 and center rolling anchor slot 428 and lay roller apparatus 202 flat onto base apparatus 208.

4) Place a nuri sheet or any other rolling wrapper onto roller apparatus 202.

5) Place frame apparatus 532 onto roller apparatus 502 and the nuri sheet. Ensure that window 537 does not show any of the nuri sheet to ensure proper alignment of the nuri sheet.

6) Spread rice within frame apparatus 532, to a thickness that is substantially aligned with the height of inner wall 536, and over an area as defined by inner wall 536. Paddle 748 may be used to spread the rice.

7) Once the rice is evenly spread, remove frame apparatus 532. Moisten the portion of the nuri sheet that was oriented at the "top" of roller apparatus 502. Moistening this portion will cause the nuri sheet to stick to itself and hold the roll closed.

8) Place the desired food ingredients onto the rice. For a larger roll use more ingredients. For a smaller roll use less ingredients.

9) The user will grab beneath roller apparatus 202 closest to the user and begin to roll the roller apparatus 202.

10) The user will bring the second end slat 212 over the roll and tighten with his fingers. This will form the first few slats of roller apparatus 202 into a substantially semi-circular shape.

11) The user will pull second end slat 212 toward first end slat 210, while the nuri sheet and ingredients roll up within roller apparatus 202. The user will continue to roll until the user reaches the end of the nuri sheet.

12) The user will squeeze roller apparatus 202 to ensure that the sushi roll is appropriately sealed to itself.

13) Remove the roll from roller apparatus 202 and place roll cutting guide apparatus 638 over the roll, such that the roll is within the hollow cavity 646.

14) Insert a knife at least one of slits 640 to cut the roll into various pieces. It may be desired to insert a knife into each of slits 640 so as to cut the roll into eight individual pieces that are of similar dimensions.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See Bryan A. Garner, A Dictionary of Modern Legal Usage 624 (2d. Ed. 1995). Also, to the extent that the terms "in" or "into" are used in the specification or the claims, it is intended to additionally mean "on" or "onto." To the extent that the term "selectively" is used in the specification or the claims, it is intended to refer to a condition of a component wherein a user of the apparatus may activate or deactivate the feature or function of the component as is necessary or desired in use of the apparatus. To the extent that the term "operatively connected" is used in the specification or the claims, it is intended to mean that the identified components are connected in a way to perform a designated function. To the extent that the term "horizontal" or "vertical" is used in the specification or the claims, it is intended to mean that the identified components are substantially horizontal or substantially vertical, respectively, when installed in a human that is standing in an upright position. As used in the specification and the claims, the singular forms "a," "an," and "the" include the plural. Finally, where the term "about" is used in conjunction with a number, it is intended to include ±10% of the number. In other words, "about 10" may mean from 9 to 11.

As stated above, while the present application has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art, having the benefit of the present application. Therefore, the application, in its broader aspects, is not limited to the specific details, illustrative examples shown, or any apparatus referred to. Departures may be made from such details, examples, and apparatuses without departing from the spirit or scope of the general inventive concept.

What is claimed is:

1. A modular food ingredient roller apparatus, comprising:
   a plurality of central slats, linked together to form a chain of central slats wherein each of the plurality of central slats comprises at least one connection mechanism on a first width side, and at least one connection mechanism on a second width side, and wherein the at least one connection mechanism of each central slat is configured to selectively and pivotally connect to the at least one connection mechanism of another central slat, such that an interconnection between adjacent central slats allows each of the adjacent central slats to pivot relative to another of the adjacent central slats about an axis that is axially aligned with the at least one connection mechanism of each central slat that selectively and removably connect the adjacent central slats;
   a first end slat comprising at least one connection mechanism on a width side, wherein the at least one connection mechanism is configured to selectively and pivotally connect to the at least one connection mechanism of a central slat, such that an interconnection between the first end slat and one of the central slats allows the first end slat to pivot relative to one of the central slats; and
   a second end slat comprising at least one connection mechanism on a width side, wherein the at least one connection mechanism is configured to selectively and pivotally connect to the at least one connection mechanism of a central slat, such that an interconnection between the second end slat and one of the central slats allows the second end slat to pivot relative to one of the central slats, wherein at least one of the central slats comprises an anchor portion extending substantially normally from a surface of the respective central slat, wherein the anchor portion is configured to selectively engage a base apparatus.

2. The apparatus of claim 1, wherein at least one of the first end slat, and the second end slat, comprise at least two grasping portions, wherein a first grasping portion extends beyond and substantially normally to a first length side of at least one of the first end slat and the second end slat, and wherein a second grasping portion extends beyond, and substantially normally to a second length side of at least one of the first end slat and the second end slat.

3. The apparatus of claim 1, wherein each of the first end slat and the second end slat, comprises two grasping portions, and wherein a first grasping portion extends substantially normally past a first length side on each of the first end slat and the second end slat, and wherein a second grasping portion extends substantially normally past a second length side on each of the first end slat and the second end slat.

4. The apparatus of claim 1, wherein a modular food ingredient apparatus formed by an interconnection between all of the plurality of central slats, the first end slat, and the second end slat, to be formed into a substantially cylindrical orientation, and wherein the substantially cylindrical orientation comprises a cylindrical diameter between 1.0 in. and about 3.0 in.

5. The apparatus of claim 1, wherein the plurality of central slats comprise at least four central slats.

6. A modular food ingredient roller system, comprising:
   a roller apparatus comprising:
      a plurality of central slats linked together to form a chain of central slats, wherein each of the plurality of the central slats comprising a connection mechanism on each of a first width side and a second width side, wherein each connection mechanism on the plurality of central slats is selectively and pivotally connectable to another connection mechanism on another of the plurality of central slats such that an interconnection between adjacent central slats allows each of the adjacent central slats to pivot relative to another of the adjacent central slats about an axis that is axially aligned with the at least one connection mechanism of each central slats that selectively and removably connect the adjacent central slats,
      a first end slat and a second end slat, each of the first end slat and the second end slat comprising a connection mechanism on a width side, wherein each of the connection mechanism on the first end slat and the second end slat is selectively and pivotally connectable to the connection mechanism on at least one of the plurality of central slats; and
      a frame apparatus comprising an inner wall and an outer wall, wherein the inner wall comprises a height, and wherein the outer wall comprises a plurality of tab portions extending from the frame apparatus and configured to engage at least two edges of the roller apparatus, wherein at least one of the central slats comprises an anchor portion extending substantially normally from a surface of the respective central slat, wherein the anchor portion is configured to selectively engage a base apparatus.

7. The system of claim 6, further comprising a base apparatus.

8. The system of claim 6, further comprising a roll cutting guide apparatus comprising a plurality of slits substantially evenly spaced and configured to accept a knife for slicing of a roll.

9. The system of claim 6, wherein the height of the inner wall of the frame apparatus provides an indication of a thickness of a food article spread within an area bounded by the inner wall.

10. The system of claim 6, wherein the inner wall of the frame apparatus provides an indication of a coverage area of a food article spread within an area bounded by the inner wall.

11. The system of claim 6, wherein the frame apparatus further comprises a window extending substantially along one edge, wherein the window is configured to indicate a position of a sheet food article placed upon the roller apparatus relative to the frame apparatus.

12. A modular food ingredient roller system, comprising:
    a roller apparatus comprising:
       a plurality of central slats linked together to form a chain of central slate, wherein each of the plurality of the central slats comprising a connection mechanism on each of a first width side and a second width side, wherein each connection mechanism on the plurality of central slats is selectively and pivotally connectable to another connection mechanism on another of the plurality of central slats, such that an interconnection between adjacent central slats allows each of the adjacent central slats to pivot relative to another of the adjacent central slats about an axis that is axially aligned with the at least one connection mechanism of each central slats that selectively and removably connect the adjacent central slats a first end slat and a second end slat, each of the first end slat and the second end slat comprising a connection mechanism on a width side, wherein each of the connection mechanism on the first end slat and the second end slat is selectively and pivotally connectable to the connection mechanism on at least one of the plurality of central slats; and a roll cutting guide apparatus comprising a plurality of slits substantially evenly spaced, and configured to accept a knife for slicing of a roll.

13. The system of claim 12, further comprising a base apparatus.

14. The system of claim 12, further comprising a frame apparatus comprising an inner wall and an outer wall, wherein the inner wall comprises a height, and wherein the outer wall comprises a plurality of tab portions extending from the frame apparatus and configured to engage at least two edges of the roller apparatus.

15. The system of claim 14, wherein the height of the inner wall of the frame apparatus provides an indication of a thickness of a food article spread within an area bounded by the inner wall.

16. The system of claim 14, wherein the inner wall of the frame apparatus provides an indication of a coverage area of a food article spread within an area bounded by the inner wall.

17. The system of claim 14, wherein the frame apparatus further comprises a window extending substantially along one edge, wherein the window is configured to indicate a position of a sheet food article placed upon the roller apparatus relative to the frame apparatus.

18. The system of claim 12, wherein the roll cutting guide apparatus comprises a substantially hollow cavity within which a roll to be placed, and wherein the plurality of slits are configured substantially transversely to the roll.

* * * * *